United States Patent
Fonseca et al.

(10) Patent No.: US 12,401,594 B2
(45) Date of Patent: Aug. 26, 2025

(54) METHOD AND SYSTEM TO PREDICT THE INGRESS INTERFACE OF INTERNET TRAFFIC

(71) Applicant: Microsoft Technology Licensing, LLC, Redmond, WA (US)

(72) Inventors: Rodrigo Fonseca, Redmond, WA (US); Sharad Agarwal, Seattle, WA (US); Ryan Andrew Beckett, Redmond, WA (US); Michael Markovitch, Providence, RI (US); Somesh Chaturmohta, Bellevue, WA (US); Chuanji Zhang, Kirkland, WA (US); Irena Atov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 17/875,994

(22) Filed: Jul. 28, 2022

(65) Prior Publication Data
US 2024/0039851 A1  Feb. 1, 2024

(51) Int. Cl.
*H04L 47/127* (2022.01)
*H04L 9/40* (2022.01)
(Continued)

(52) U.S. Cl.
CPC ........ *H04L 47/127* (2013.01); *H04L 43/0882* (2013.01); *H04L 43/16* (2013.01); *H04L 63/1425* (2013.01); *H04L 67/1093* (2013.01)

(58) Field of Classification Search
CPC ... H04L 47/127; H04L 43/0882; H04L 43/16; H04L 63/1425; H04L 67/1093;
(Continued)

(56) References Cited

U.S. PATENT DOCUMENTS

2013/0311160 A1* 11/2013 Cowie ................... H04W 40/20
                                                                     703/13
2020/0007435 A1*  1/2020 Paida .................. H04L 43/0894

FOREIGN PATENT DOCUMENTS

CN           115622895 A   *   1/2023

OTHER PUBLICATIONS

Paul Krzyzanowski, Understanding Autonomous Systems [online], Mar. 21, 2016 [retrieved on Jan. 7, 2025], retrieved from the Internet: <URL: https://people.cs.rutgers.edu/~pxk/352/notes/autonomous_systems.html> (Year: 2016).*

(Continued)

*Primary Examiner* — Charles C Jiang
*Assistant Examiner* — Rachel Elizabeth Marks
(74) *Attorney, Agent, or Firm* — ArentFox Schiff LLP

(57) ABSTRACT

The present application relates to a system for ingress traffic management. The system includes a collection system within a network configured to collect traffic arrival information for peering links of the network. The system includes a training system configured to train a model based on the traffic arrival information to predict a probability of a traffic flow arriving on a peering link. The system includes a congestion mitigation system configured to predict based on the model, for traffic flows arriving on one or more peering links, other peering links to which the traffic flows would be shifted due to a condition affecting the one or more peering links. The congestion mitigation system may determine, in response to the condition, a set of prefixes to withdraw based on the other peering links to which traffic would be shifted.

16 Claims, 7 Drawing Sheets

(51) Int. Cl.
    *H04L 43/0882* (2022.01)
    *H04L 43/16* (2022.01)
    *H04L 67/1087* (2022.01)

(58) Field of Classification Search
    CPC ....... H04L 45/04; H04L 41/147; H04L 69/40; H04L 67/289; H04L 41/16; H04L 45/08; H04L 41/149; G06N 20/20
    See application file for complete search history.

(56) References Cited

OTHER PUBLICATIONS

Machine translated English version of CN 115622895 retrieved from PE2E on Jan. 23, 2025 (Year: 2023).*

"Arista Software Defined Cloud Networking", Retrieved from: https://www.arista.com/en/solutions/software-defined-networking, Retrieved Date: Jul. 31, 2022, 5 Pages.

"Barracuda CloudGen WAN", Retrieved from: https://www.barracuda.com/products/cloudgenwan, Retrieved Date: Jul. 31, 2022, 6 Pages.

Agarwal, et al., "Measuring the Shared Fate of IGP Engineering and Interdomain Traffic", In Proceedings of 13th IEEE International Conference on Network Protocols (ICNP'05), Nov. 6, 2005, 10 Pages.

Arnold, et al., "Cloud Provider Connectivity in the Flat Internet", In Proceedings of the ACM Internet Measurement Conference, IMC, Oct. 2020, pp. 230-246.

Awduche, et al., "Requirements for Traffic Engineering Over MPLS", Retrieved from: https://datatracker.ietf.org/doc/html/rfc2702, Sep. 1999, 29 Pages.

Bogle, et al., "TEAVAR: Striking the Right Utilization-availability Balance in WAN Traffic Engineering", In Proceedings of the ACM Special Interest Group on Data Communication, SIGCOMM, Aug. 19, 2019, 15 Pages.

Caesar, et al., "Design and Implementation of a Routing Control Platform", In Journal of 2nd Symposium on Networked Systems Design & Implementation, vol. 2, May 2, 2005, pp. 15-28.

Choudhury, et al., "Two Use Cases of Machine Learning for SDN-Enabled IP/Optical Networks: Traffic Matrix Prediction and Optical Path Performance Prediction [Invited]", In Journal of Optical Communications and Networking, vol. 10, Issue 10, Oct. 24, 2018, pp. 52-62.

Claise, B, et al., "Specification of the IP Flow Information Export (IPFIX) Protocol for the Exchange of Flow Information", Retrieved from: https://datatracker.ietf.org/doc/html/rfc7011, Sep. 2013, 76 Pages.

Duda, et al., "Pattern Classification and Scene Analysis", In Publication of Wiley-Interscience publication, vol. 3, Jan. 1, 1973.

Elwalid, et al., "MATE: MPLS Adaptive Traffic Engineering", In Twentieth Annual Joint Conference of the IEEE Computer and Communications Society, Apr. 22, 2001, pp. 1300-1309.

Gao, et al., "Interdomain Ingress Traffic Engineering Through Optimized AS-Path Prepending", In Proceedings 4th International IFIP-TC6 Networking Conference, May 2, 2005, pp. 647-658.

Griffin, et al., "Analysis of the MED Oscillation Problem in BGP", In Proceedings of the 10th IEEE International Conference on Network Protocols, Nov. 12, 2002, pp. 1092-1648.

Gupta, et al., "SDX: A Software Defined Internet Exchange", In Journal ACM SIGCOMM Computer Communication Review, vol. 44, Issue 4, Aug. 17, 2014, pp. 551-562.

Hong, et al., "Achieving High Utilization with Software-driven WAN", In Proceedings of the ACM SIGCOMM conference on SIGCOMM, Aug. 27, 2013, pp. 15-26.

Jain, et al., "B4: Experience with a Globally-Deployed Software Defined WAN", In Journal of ACM SIGCOMM Computer Communication Review, vol. 43, Issue 4, Aug. 27, 2013, 12 Pages.

Jin, et al., "Stable and Practical AS Relationship Inference with ProbLink", In 16th USENIX Symposium on Networked Systems Design and Implementation, Feb. 26, 2019., pp. 581-597.

Kandula, et al., "Walking the Tightrope: Responsive Yet Stable Traffic Engineering", In Journal of ACM SIGCOMM Computer Communication Review, vol. 35, Issue 4, Aug. 22, 2005, pp. 253-264.

Keller, et al., "Rehoming Edge Links for Better Traffic Engineering", In Journal of ACM SIGCOMM Computer Communication Review, vol. 42, Issue 2, Apr. 2012, pp. 66-71.

Kiong Yap, et al., "Taking the Edge off with Espresso: Scale, Reliability and Programmability for Global Internet Peering", In Proceedings of the Conference of the ACM Special Interest Group on Data Communication, Aug. 7, 2017, pp. 432-445.

Krishnaswamy, et al., "Data-Driven Learning to Predict wan Network Traffic", In Proceedings of the 3rd International Workshop on Systems and Network Telemetry and Analytics, 2020, pp. 11-18.

Michael, et al., "HALO: Hop-by-Hop Adaptive Link-State Optimal Routing", In Journal of IEEE/ACM Transactions on Networking vol. 23, Issue 6, Sep. 10, 2014, pp. 1862-1875.

Naseer, et al., "Zero Downtime Release: Disruption-free Load Balancing of a Multi-Billion User Website", In Proceedings of the Annual conference of the ACM Special Interest Group on Data Communication on the applications, technologies, architectures, and protocols for computer communication, 2020, 13 Pages.

Pujol, et al., "Steering Hyper-Giants' Traffic at Scale", In Proceedings of the 15th International Conference on Emerging Networking Experiments and Technologies, Dec. 9, 2019, pp. 82-95.

Schimbinschi, et al., "Traffic Forecasting in Complex Urban Networks: Leveraging Big Data and Machine Learning", In Proceeding of IEEE International Conference on Big Data (Big Data), Oct. 29, 2015, pp. 1019-1024.

Schlinker, et al., "Engineering Egress with Edge Fabric: Steering Oceans of Content to the World", In Proceedings of the Conference of the ACM Special Interest Group on Data Communication, Aug. 7, 2017, pp. 418-431.

Scudder, J. et al., "BGP Monitoring Protocol", Retrieved from: https://datatracker.ietf.org/doc/html/rfc7854, Jun. 2016, 27 Pages.

Subramanian, et al., "Characterizing the Internet hierarchy from multiple Vantage Points", In Proceedings Twenty-First Annual Joint Conference of the IEEE Computer and Communications Societies, Jun. 23, 2002, pp. 618-627.

Wang, et al., "COPE: Traffic Engineering in Dynamic Networks", In Proceedings of the conference on Applications, technologies, architectures, and protocols for computer communications, Sep. 2006, pp. 99-110.

Zhang, et al., "The Optimality of Naive Bayes", In Proceedings of the Seventeenth International Florida Artificial Intelligence Research Society Conference, 2004, 6 Pages.

* cited by examiner

METHOD AND SYSTEM TO PREDICT THE INGRESS INTERFACE OF INTERNET TRAFFIC

BACKGROUND

A cloud network may be implemented on a wide area network (WAN) that includes computing resources spread across a geographic region and connected via communication links such as fiber optic cables or satellite connectivity. A cloud provider may host cloud applications for its clients. For example, a cloud provider may provide infrastructure as a service (IaaS) services such as virtual machines (VM), platform as a service (PaaS) services such as databases and serverless computing, and software as a service (SaaS) services such as authentication platforms. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

Clients of the cloud provider may obtain access to the cloud network or WAN via the Internet. A path between the client and the cloud network may include one or more Internet Service Providers (ISPs) or autonomous systems (AS). A WAN may include multiple peering links via which the WAN is connected to ASes. A geographic location of the peering links may be referred to as a point of presence (POP). In general, traffic traversing the Internet may be routed on a lowest cost basis. Accordingly, the WAN may not have significant control of routing decisions for ingress traffic. For example, a WAN may be able to completely withdraw an announcement that advertises reachability of a prefix over a peering link, but may not be able to control whether ASes deliver traffic to any advertised peering link.

Ingress traffic congestion poses a potential problem for a WAN. Because a WAN cannot effectively select which peering link will receive traffic, it is possible that one or more peering links may become overloaded with ingress traffic while other peering links operate well below capacity. Accordingly, there is a need to improve ingress traffic management for WANs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system for ingress traffic management including: a collection system within a network configured to collect traffic arrival information for peering links of the network; a training system configured to train a model based on the traffic arrival information to predict a probability of a traffic flow arriving on a peering link; and a congestion mitigation system configured to predict based on the model, for traffic flows arriving on one or more peering links, other peering links to which the traffic flows would be shifted due to a condition affecting the one or more peering links. The congestion mitigation system is configured to determine, in response to the condition, a set of prefixes to withdraw based on the other peering links to which traffic would be shifted; and inject a route withdrawal message into an edge router associated with the one or more peering links for the set of prefixes to withdraw.

In some aspects, the techniques described herein relate to a system, wherein the set of prefixes to withdraw is predicted to result in the traffic shifted to the other peering links to be less than a headroom of the other peering links.

In some aspects, the techniques described herein relate to a system, wherein to determine the set of prefixes to withdraw, the congestion mitigation system is configured to filter output of the model to exclude a second set of peering links based on the condition.

In some aspects, the techniques described herein relate to a system, wherein to determine the set of prefixes to withdraw, the congestion mitigation system is configured to: determine that a utilization level for a peering link has exceeded a utilization threshold; determine a set of candidate prefixes that have been announced for the peering link and an amount of traffic for each candidate prefix; select at least one candidate prefix of the set of candidate prefixes with an amount of traffic that would reduce the utilization level of the peering link below the utilization threshold if stopped, wherein traffic flows for the at least one candidate prefix are the traffic flows arriving on one or more peering links that are provided to the model; and allocate an amount of volume of the traffic flows for the at least one prefix to the other peering links to which traffic would be shifted to determine whether withdrawal of the at least one prefix would result in traffic to the other peering links to exceed a headroom of the other peering links.

In some aspects, the techniques described herein relate to a system, wherein amount of volume includes one or more of a minimum volume, a probable volume, or a maximum volume.

In some aspects, the techniques described herein relate to a system, wherein the congestion mitigation system is configured to apply a received flow to the model to determine whether arrival information of the received flow corresponds to predicted arrival information for the received flow.

In some aspects, the techniques described herein relate to a system, wherein the congestion mitigation system is configured to route the received flow for processing as potentially malicious traffic in response to the arrival information of the received flow not matching predicted arrival information for the received flow.

In some aspects, the techniques described herein relate to a system, wherein the model is a historical model with a feature set including at least a source autonomous system (AS), a destination region, and a destination type for each traffic flow.

In some aspects, the techniques described herein relate to a system, wherein the model is configured to output probabilities for at least three other peering links.

In some aspects, the techniques described herein relate to a method including: training a model based on traffic arrival information for peering links of a network to predict a probability of a traffic flow arriving on a peering link; and predicting based on the model, for traffic flows arriving on one or more peering links, other peering links to which the traffic flows would be shifted due to a condition affecting the one or more peering links; determining, in response to the condition, a set of prefixes to withdraw based on the other peering links to which traffic would be shifted; and injecting a route withdrawal message into an edge router associated with the one or more peering links for the set of prefixes to withdraw.

In some aspects, the techniques described herein relate to a method, wherein the set of prefixes to withdraw is predicted to result in the traffic shifted to the other peering links to be less than a headroom of the other peering links.

In some aspects, the techniques described herein relate to a method, wherein determining, in response to the condition, the set of prefixes to withdraw includes filtering output of the model to exclude a second set of peering links based on the condition.

In some aspects, the techniques described herein relate to a method, wherein determining, in response to the condition, the set of peering links to withdraw includes: determining that a utilization level for a peering link has exceeded a utilization threshold; determining a set of candidate prefixes that have been announced for the peering link and an amount of traffic for each candidate prefix; selecting at least one candidate prefix of the set of candidate prefixes with an amount of traffic that would reduce the utilization level of the peering link below the utilization threshold if stopped, wherein traffic flows for the at least one candidate prefix are the traffic flows arriving on one or more peering links that are provided to the model; and allocating an amount of volume of the traffic flows for the at least one prefix to the other peering links to which traffic would be shifted to determine whether withdrawal of the at least one prefix would result in traffic to the other peering links to exceed a headroom of the other peering links.

In some aspects, the techniques described herein relate to a method, wherein amount of volume includes one or more of a minimum volume, a probable volume, or a maximum volume.

In some aspects, the techniques described herein relate to a method, further including applying a received flow to the model to determine whether arrival information of the received flow corresponds to predicted arrival information for the received flow.

In some aspects, the techniques described herein relate to a method, further including routing the received flow for processing as potentially malicious traffic in response to the arrival information of the received flow not matching predicted arrival information for the received flow.

In some aspects, the techniques described herein relate to a method, wherein the model is a historical model with a feature set including at least a source autonomous system (AS), a destination region, and a destination type for each traffic flow.

In some aspects, the techniques described herein relate to a method, wherein the model is configured to output probabilities for at least three other peering links.

In some aspects, the techniques described herein relate to a non-transitory computer-readable medium storing computer-executable instructions that when executed by a processor, cause the processor to: train a model based on traffic arrival information for peering links of a network to predict a probability of a traffic flow arriving on a peering link; predict based on the model, for traffic flows arriving on one or more peering links, other peering links to which the traffic flows would be shifted due to a condition affecting the one or more peering links; and determine whether the network has sufficient capacity on the other peering links for the traffic flows.

In some aspects, the techniques described herein relate to a non-transitory computer-readable medium, wherein the condition is a hypothetical failure of the one or more peering links.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
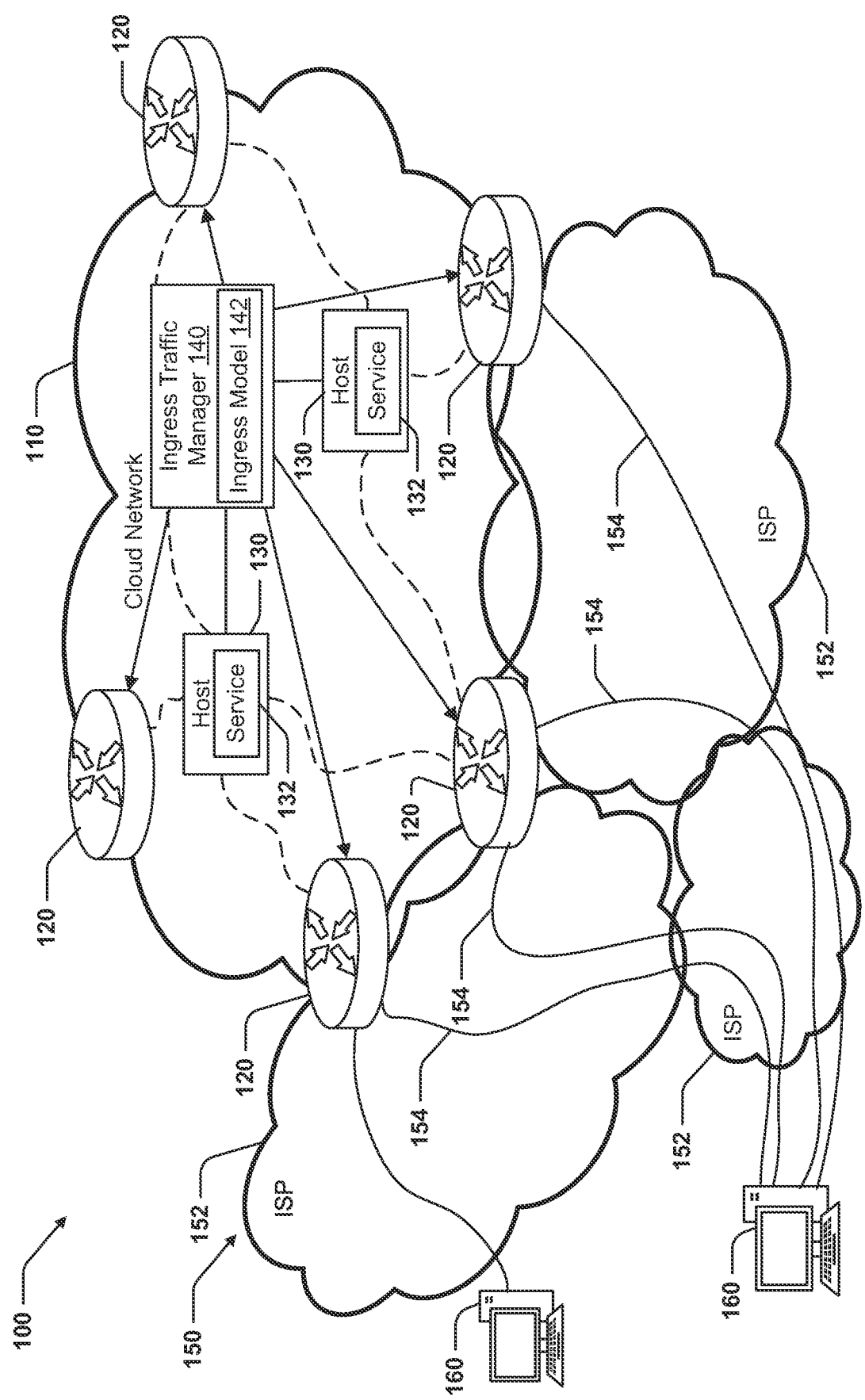
FIG. 1 is a diagram of an example of an architecture for ingress traffic management to a cloud network, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to ingress traffic management in a cloud network, which may be a public cloud network or a private cloud network. Because a cloud network may be accessed via the Internet, a cloud service provider may not control an end-to-end path between a client and a host for a service. For example, traffic for the cloud network may traverse one or more Internet Service Providers (ISPs) or other autonomous systems (ASes) between the client and an edge of the public cloud network. The traffic may be routed according to a routing policy of the ASes, which may be, for example, best efforts or lowest cost routing. Accordingly, a cloud network may not be able to control at which of its advertised peering links ingress traffic arrives.

Ingress congestion may refer to a scenario where at least one peering link is overloaded. For example, an amount of traffic received at a peering link may exceed a capacity of the hardware connection (e.g., line and/or switch) of the peering link. In an ingress congestion scenario, packets may be buffered and/or dropped leading to observable degradation of network performance (e.g., latency or dropped connections).

A cloud network may also receive malicious ingress traffic. For example, a malicious actor may attempt to gain access by spoofing information within an IP packet. For example, a malicious Internet protocol (IP) packet may have false source information to impersonate another entity or conceal a source of an attack.

Although a cloud network does not have control over routing within or between the ASes, the cloud network may control advertisement of routes to the cloud network. For example, each AS may be associated with a border gateway protocol (BGP) session. The BGP session may advertise available routes to a peering link of the cloud network. The ASes may route traffic based on mostly static or slowly changing routing rules. For example, the static routing rules may define a path that will eventually reach the cloud network via one of the BGP sessions. One technique that a cloud network can use to control ingress traffic is to withdraw one or more routes from a BGP session. For example, a route may be identified by an IP prefix. Once a route is withdrawn, the ASes may select a different route for a flow to reach the cloud network. A prefix withdrawal may cause the traffic from the withdrawn route to shift to other advertised routes and peering links. In some cases, a route withdrawal during an ingress congestion scenario may cause a cascading effect that causes other peering links to become overloaded. For example, all of the routes to an overloaded peering link are withdrawn, the traffic may simply shift to another peering links and overload that peering link.

In an aspect, the present disclosure provides a system to predict where ingress traffic will arrive at a network under certain conditions. The system includes a model trained on ingress flow information to predict a probability of a flow arriving on a peering link. The model is used to predict, for traffic flows arriving on one or more peering links, other peering links to which the traffic flows would be shifted due to a condition affecting the one or more peering links. For instance, in the case of ingress traffic congestion, one or more flows of a congested peering link are applied to the model to predict where the traffic for the flows would arrive if the route were to be withdrawn from the congested peering link. The prediction may be used to determine whether withdrawing the route would result in ingress congestion at another peering link. In some implementations, an ingress congestion mitigation system may select which routes to withdraw based on where the traffic is most likely to be shifted.

In an aspect, for example, this disclosure provides systems and methods for ingress traffic management for a network. For example, by predicting where traffic will arrive under various conditions, ingress traffic management improves network capacity planning to provision the network for the various conditions. In some implementations, the ingress traffic management includes congestion mitigation such as selection of routes or prefixes to withdraw from BGP announcements based on predicted traffic shifts. The selection of routes or prefixes prevents cascading ingress congestion by selecting routes that will be redirected to peering links with capacity or headroom to handle additional traffic. In another aspect, suspicious flow detection based on whether a peering link of a received flow corresponds to a predicted peering link is used to identify malicious traffic such as traffic with spoofed IP headers. The potentially malicious traffic can be sent to a denial of service scrubber to protect against denial of service attacks against the network.

Figure 3:
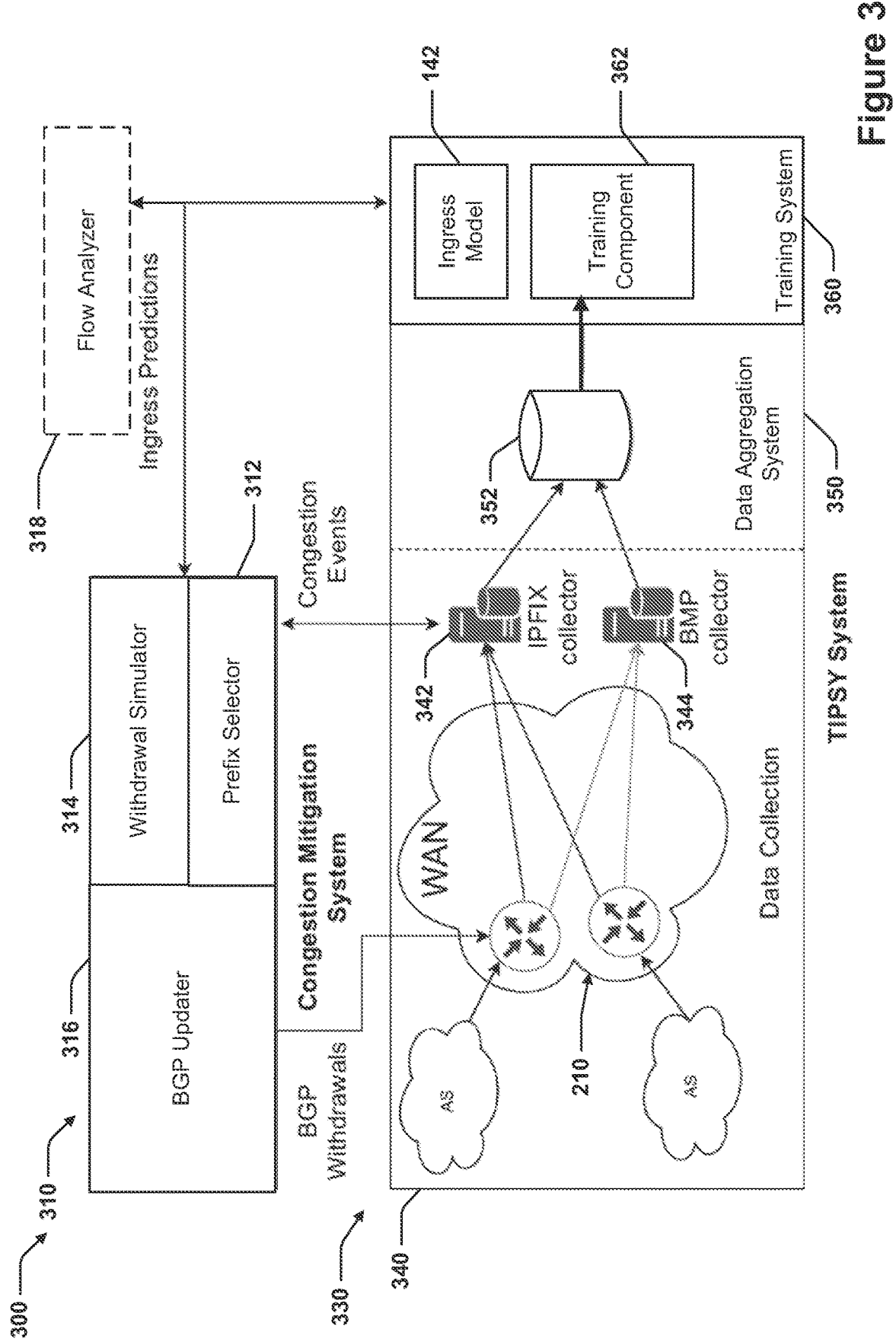
FIG. 3 is a diagram of an example of an ingress congestion mitigation system, in accordance with aspects described herein.
Figure 4:
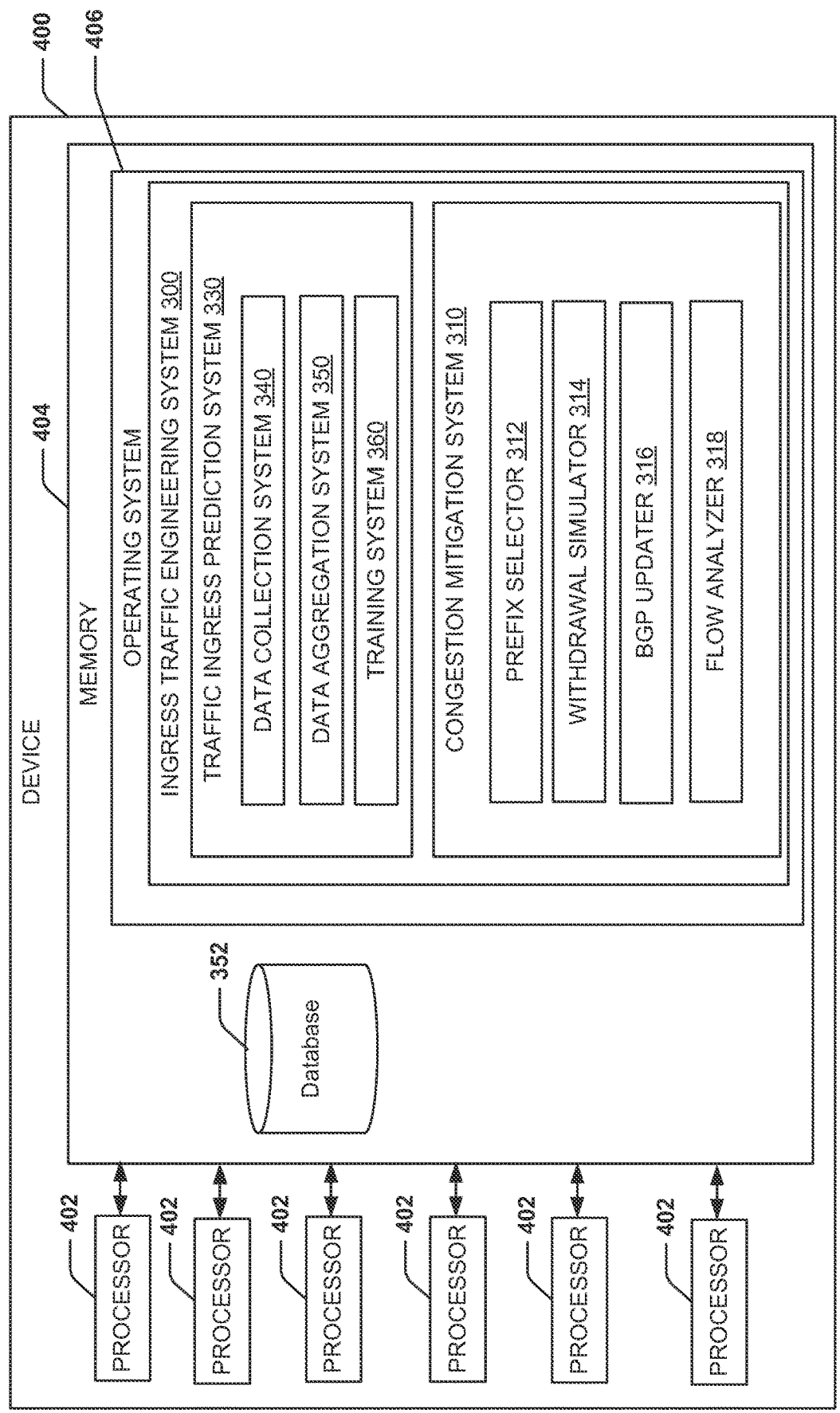
FIG. 4 is a flow diagram of an example method of ingress traffic management in a cloud network, in accordance with aspects described herein.
Figure 5:
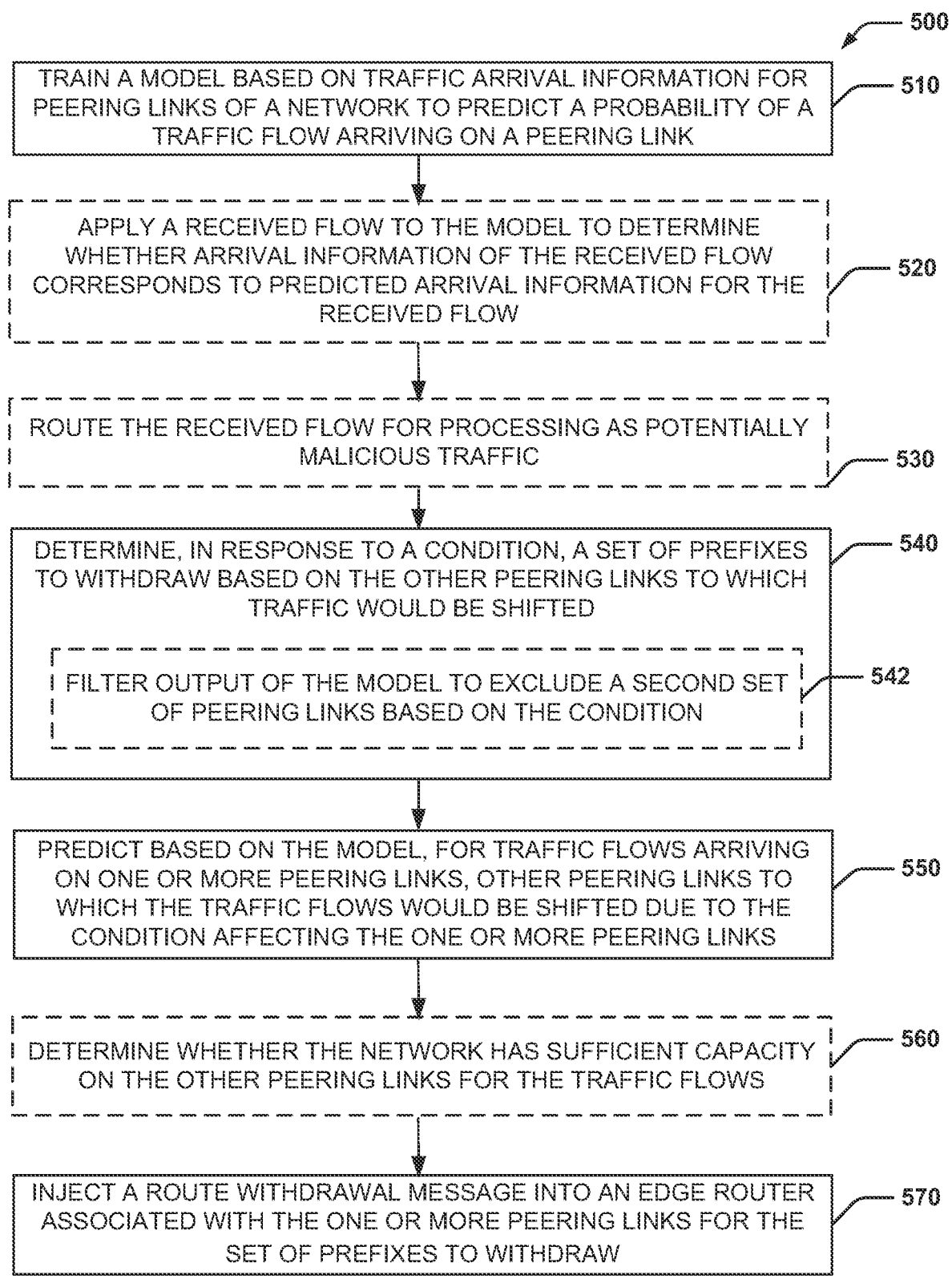
FIG. 5 is a flow diagram of an example of a method of ingress congestion mitigation in a cloud network, in accordance with aspects described herein.
Figure 6:
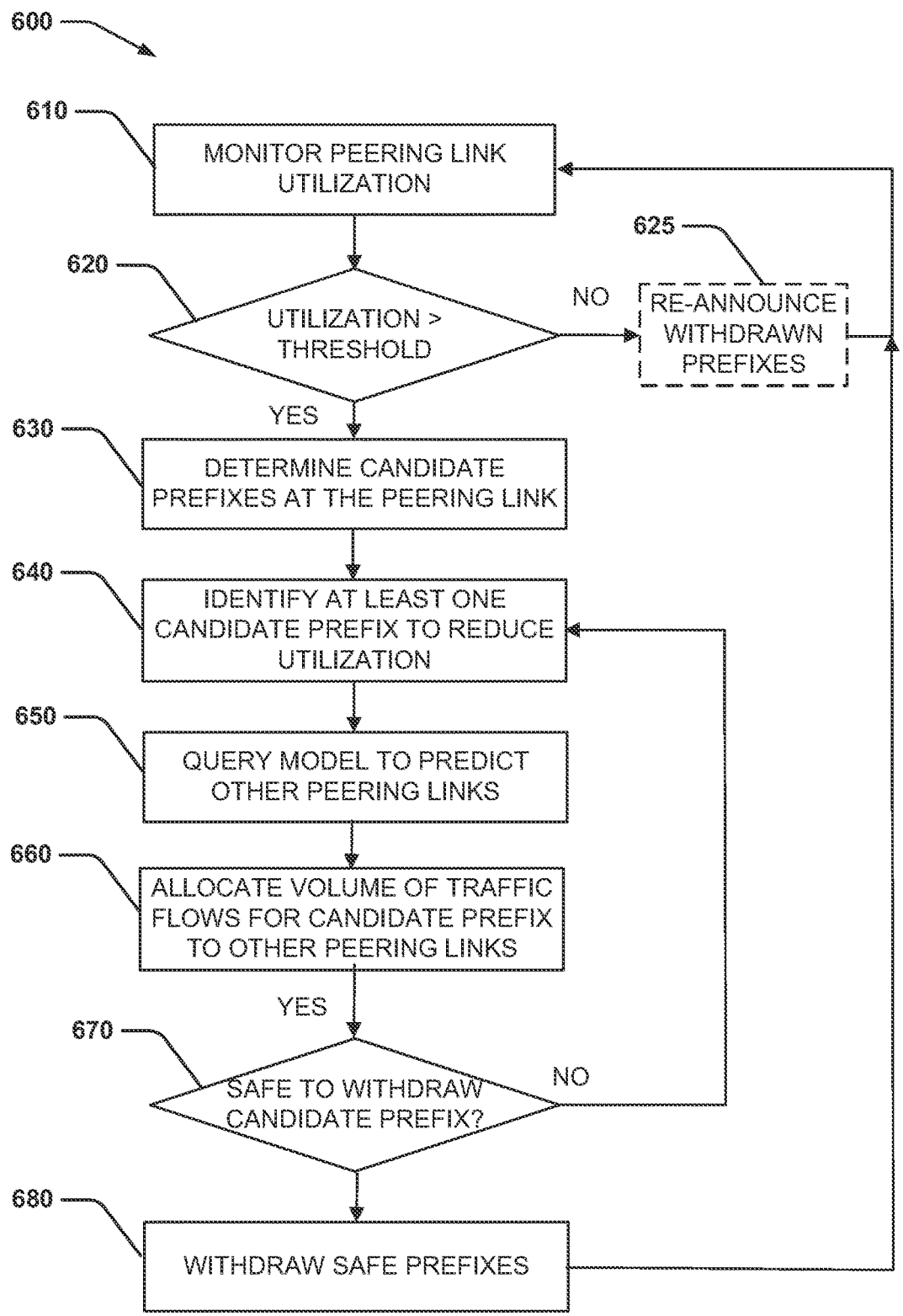
FIG. 6 is a schematic diagram of an example of a device for ingress congestion mitigation in a cloud network, in accordance with aspects described herein.

Turning now to FIGS. 1-7, examples are depicted with reference to one or more components and one or more methods that may perform the actions or operations described herein, where components and/or actions/operations in dashed line may be optional. Although the operations described below in FIGS. 5 and 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a cloud network 110. The cloud network 110 may include computing resources that are controlled by a network operator and accessible to public clients 160 via an internet 150. For example, the cloud network 110 may include a plurality of hosts 130 that host services 132. Each host 130 may be, for example, a virtual machine on a computing resource such as a server located in a datacenter. The cloud network 110 may include edge routers 120 that connect the hosts 130 to external networks 152 such as internet service providers (ISPs) or other ASes that form the internet 150. The network operator may charge a client 160 to access the cloud network 110 and/or charge a service operator (e.g., a web application) for hosting a service 132.

In an example use case, the client 160 makes a request to a service 132. The host 130 of the service 132 processes the request according to the service and sends traffic to the client 160 and/or another client associated with the service 132. The traffic from the client 160 to the host 130 is considered a traffic flow including Internet protocol (IP) packets having similar properties such as an IP 5-tuple. As illustrated, the architecture of the cloud network 110 includes numerous paths between a client 160 and the host 130. Further, traffic for different clients 160 may traverse similar or different paths. The paths also include an external portion (e.g., from the client 160 to the edge router) that is controlled by the external networks 152 that form the internet 150. This external portion of the path is referred to as an ingress path. The paths may include an internal portion within the cloud network 110 (e.g., from an edge router 120 to the host 130) that is entirely under control of the operator of the cloud network 110. Conventionally, routing over an internet 150 is performed on a best-efforts basis. The client 160 sends a flow of IP packets to its ISP, which routes the flow toward a host 130 based on the destination IP address. For example, the semi-static routing rules of the external network 152 may define a path that will eventually reach the host 130. Similarly, routing within the internet 150 may be performed on a best-efforts basis, where external networks 152 select a route for traffic using static routing rules, for example, based on cost.

In some implementations, each external network 152 (e.g., an ISP) is associated with a border gateway protocol (BGP) session 154 for the edge router 120. With many possible ingress peering points, the cloud network 110 may make heavy use of BGP anycast, advertising internal prefixes on most or all peering links. At each AS hop of an incoming flow, there can be multiple routes to take, and the final routes result from independent decisions of each AS in the path. When there is congestion on an incoming link, the most effective solution for the affected network may be to selectively stop advertising one or more prefixes on the affected peering. The difficulty with this approach is that it may trigger a new set of independent decisions by the ASes on the path, causing the traffic to go to other links, which in turn become congested themselves.

In an aspect, management of ingress traffic at a cloud network 110 is improved by predicting where ingress flows are most likely to arrive. The cloud network 110 includes an ingress traffic manager 140 that is configured to predict, based on an ingress model 142, where traffic flows arriving on one or more peering links is likely to be shifted due to a condition affecting the one or more peering links. In some implementations, the ingress traffic manager 140 takes actions to mitigate ingress congestion based on the prediction. For example, the ingress traffic manager 140 may determine, in response to a condition, a set of route prefixes to withdraw based on the other peering links to which traffic would be shifted. The ingress traffic manager 140 may determine to withdraw an advertised route from a BGP session 154.

Figure 2:
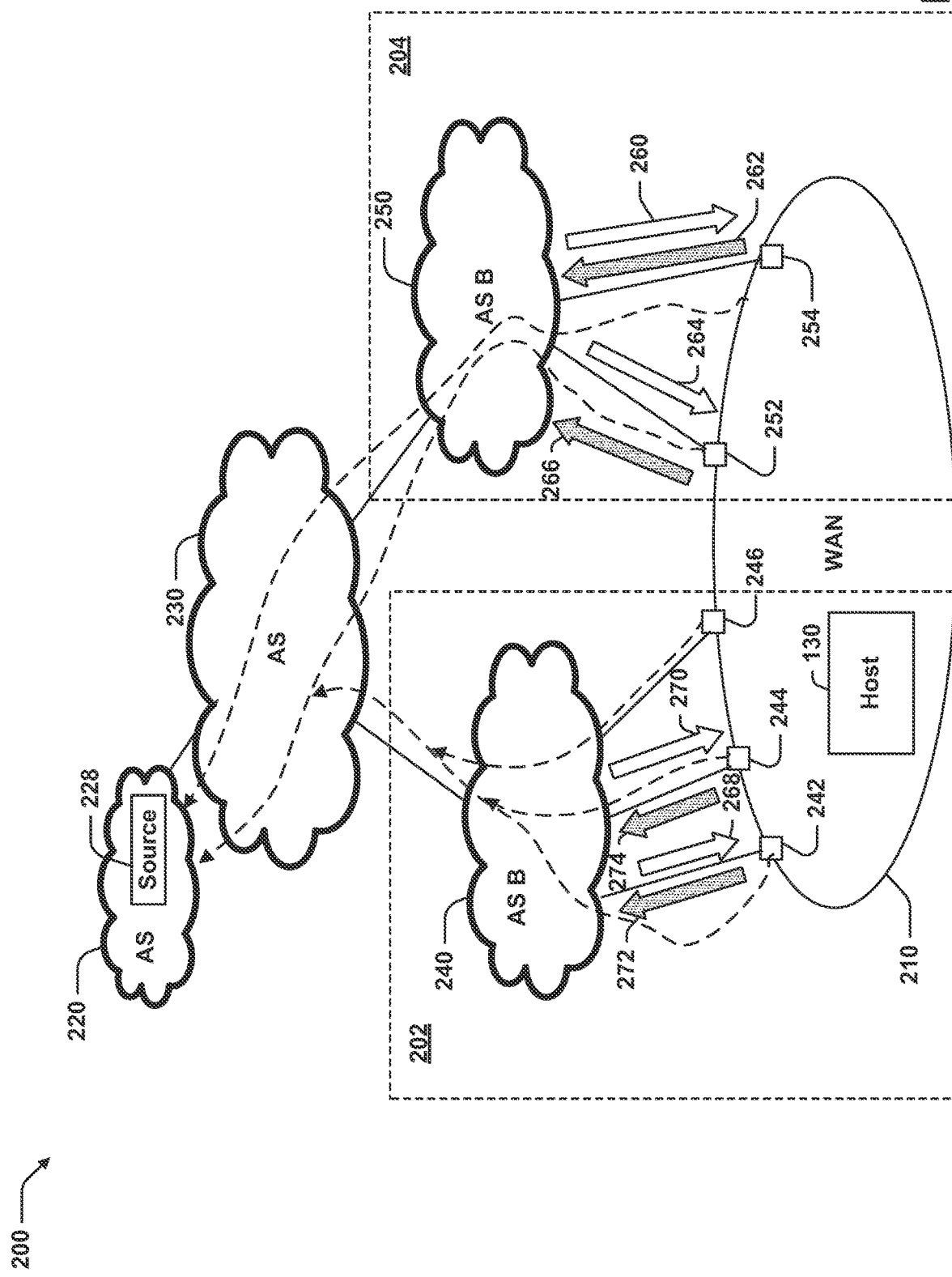
FIG. 2 is a diagram of an example of an ingress traffic incident.

FIG. 2 is a diagram of an example of a network topology 200 and traffic during an ingress traffic incident. Ingress traffic incidents pose a significant problem for large cloud service provides. For example, a global WAN may experience ingress congestion events that result in a few hundred BGP prefix withdrawals per week, on average. In some of these, withdrawals from one peering link causes cascading congestion that can lead to a succession of other withdrawals until traffic is sufficiently dispersed.

The network topology 200 includes a WAN 210, which may correspond to the cloud network 110. The WAN is connected to an AS 220 via ASes 230, 240, and 250. The AS 240 and the AS 250 may be part of the same AS (AS B) (e.g., a content delivery network (CDN) or mobile network) with peering links in multiple locations. For example, the AS 240 may be located in a location 202 and the AS 250 may be located in a location 204. The AS 220 includes a source 228 that sends a traffic flow (e.g., IP packets) to a host 130 in the WAN 210. Initially, as an example, the WAN 210 advertises routes using BGP anycast for peering links 242, 244, and 246 with AS 240 and peering links 252 and 254 with AS 250. It should be appreciated that a larger number of peering links (e.g., thousands or hundreds of thousands) may be advertised in a large (e.g., global) network. For instance, the peering links 242, 244, and 246 each have a capacity of 100 Gbps and the peering links 252 and 254 each have a capacity of 400 Gbps. The ASes 240 and 250 propagate the BGP anycast advertisements to establish routes to AS 220 via AS 230.

During an example ingress congestion event, a peering link 254 with 400 Gbps capacity with peer AS 250 hit 90% utilization for traffic 260 in the ingress direction, which exceeded a utilization threshold and potentially impact network performance. To mitigate this congestion, a BGP withdrawal 262 was issued for a/10 anycast prefix at link 254. Utilization of link 254 subsequently dropped to about 18%. However, peering link 252, also with 400 Gbps capacity with the same peer in the same geographic location 204, took on some of that load and the link 252 then exceeded 80% ingress utilization for traffic 264, which was also considered above the threshold. Another BGP withdrawal 266 was issued for the same prefix at link 252. The BGP withdrawal 266 caused peering links 242 and 244 with the same peer but with only 100 Gbps capacity each in location 202 to hit 97% and 85% utilization due to traffic 268 and 270. Additional BGP withdrawals 272 and 274 were then issued for that prefix at link 242 and link 244, at which point that load was spread diversely enough to not exceed the safe utilization threshold. In an aspect, network performance is improved by preventing such cascading ingress congestion.

In an aspect, predicting the likely outcome of prefix withdrawals in this incident is non-trivial. There are hundreds of transit peering connections that the traffic from AS 230 240 could have theoretically arrived on. Focusing on only the direct peering connections with AS 230 may include 60 different routers in 31 locations across the world. Even if focusing within a single country, there may be many direct peering links with AS 240 at 7 different geographic locations.

In an aspect, an ingress model 142 trained on 90 days of data prior to the above example ingress congestion incident predicts where ingress traffic will arrive. For example, the ingress model 142 is queried against the flows that arrived on link 254 to the prefix that was withdrawn. The ingress model 142 identified link 252 as being at highest risk, (e.g., likely to receive 50 Gbps additional load), followed by link 242 and link 244 getting 47 Gbps of additional load. The ingress model 142 also identified additional links (e.g., link 246), each expected to receive fewer than 4 Gbps of additional load. Armed with this information, a network operator or the ingress traffic manager 140 may have better options for responding to an ingress congestion incident. For example, the ingress traffic manager 140 may have withdrawn the prefix from all of links 252, 254, 242, and 244 at the start of the incident and avoid the cascade of congestion events that resulted in lengthy packet delays and drops. Alternatively, the ingress traffic manager 140 may have focused on other prefixes that would not have resulted in a cascade and would still shift sufficient traffic to mitigate congestion on link 254.

FIG. 3 is a diagram of an example of a high-level architecture an ingress traffic engineering system 300. The ingress traffic engineering system 300 may include a congestion management system (CMS) 310 and a traffic ingress prediction system 330.

The CMS 310 includes a prefix selector 312, a withdrawal simulator 314, and a BGP updater 316. In some implementations, the CMS 310 may include a flow analyzer 318. The prefix selector 312 is configured to monitor utilization rate of peering links and select prefixes to withdraw when the utilization rate exceeds a threshold. The withdrawal simulator 314 is configured to utilize the traffic ingress prediction system to estimate the effects of withdrawing the selected prefixes on other peering links. If the selected prefixes will result in further congestion, the withdrawal simulator 314 may mask unacceptable withdrawal options, and the prefix selector 312 selects different prefixes to withdraw. If the selected prefixes will reduce ingress congestion, the withdrawal simulator 314 provides the selected prefixes and peering locations to the BGP updater 316. The flow analyzer 318 may be configured to detect potentially malicious traffic flows by comparing traffic arrival information of a received flow to predicted information for the received flow. If the traffic arrival information does not match the predicted information, the flow analyzer may route the traffic flow for processing as potentially malicious traffic (e.g., a denial of service scrubber).

The traffic ingress prediction system 330 includes a data collection system 340, a data aggregation system 350, and a training system 360. The data collection system 340 is configured to collect ingress traffic information from a network such as the cloud network 110 or the WAN 210. For example, in some implementations, the data collection system 340 includes an Internet Protocol Flow Information Export (IPFIX) collector 342 and a BGP Monitoring Protocol (BMP) collector 344. The traffic ingress prediction system 330 includes a data aggregation system 350 that receives ingress traffic information from multiple collectors and stores the ingress traffic information in a database 352, which may be a distributed data lake. The traffic ingress prediction system 330 includes a training system 360. The training system 360 includes a training component 362. The training system 360 generates the ingress model 142.

In an implementation, the traffic ingress prediction system 330 is run online (e.g., within the WAN 210) as a prediction service and the training system 360 is configured to re-train the ingress model 142 daily. Given the timescale of the actions that the ingress traffic engineering system 300 enables, daily training provides a good trade off of accuracy and cost. That is, the ingress traffic engineering system 300 can make fast predictions for the congestion mitigation system 310 while also maintaining accurate prediction models and reducing compute cost (e.g., of training the ingress model 142).

To enable effective ingress traffic engineering, the ingress traffic engineering system 300 focuses on the problem of predicting the ingress link that traffic will use. A large cloud provider network, such as a global WAN, may have thousands of peering links across many different ASes. The WAN may connect to some small ASes via a single peering link, while larger ASes may have many peering links with the WAN, spread around multiple metro regions around the world. For example, referring back to FIG. 2, the high-level network topography 200 shows of how packets from the source 228, in a remote AS 220, find a route to host 130 in the WAN 210. The ingress path taken from source 228 to host 130 is constrained by the advertisements made by the WAN 210, but each AS 230, 240, 250 along the path to AS 220 also makes independent choices as to which of multiple routes to select, and re-advertise. Using BGP any-cast, the prefix for the host 130 may be advertised on multiple, typically all, peering links, and those advertisements spread outward. Predicting the ingress link for traffic is a challenging problem for a number of reasons:

1) Many possibilities: As shown in FIG. 2, the combination of BGP anycast with the increasingly densely connected AS topology 200 results in a large diversity of possible Internet paths that traffic may take from any given source. Moreover, determining the exact path that will be taken would require knowledge of all the inter-domain and intra-domain policies and traffic engineering systems used by each AS along the path(s) from the source 228 to the WAN 210.
2) Asymmetry of control: Unlike with egress traffic, where operators can select on which outgoing links to send traffic, there is very little that operators can do to steer ingress traffic beyond coarse mechanisms such as the BGP multi-exit discriminator (MED) attribute or selective advertising. Even then, it is hard to predict the outcomes of these measures, as the outcomes ultimately depend on independent decisions by other ASes.
3) Lack of visibility: Peering agreements between ASes are not necessarily public, nor always visible through BGP announcements. Even state-of-the-art Internet topology research is based on incomplete data gathered from BGP listeners (and it has limited information about multiple peerings between the same ASes at different locations. Furthermore, BGP advertisements provide information about reachability in a single direction (egress) and there is no guarantee or even likelihood of symmetry.
4) Constant change: Lastly, the Internet topology is constantly changing, due to intentional changes (peering and de-peering, traffic engineering, etc.), and un-intentional changes (BGP route flapping, fiber cuts, etc.).

To help quantify the difficulty of the ingress prediction problem, the Internet topology for a global WAN was analyzed using BGP Monitoring Protocol (BMP) data, and inbound traffic using Internet Protocol Flow Information Export (IPFIX) data, collected from all of the edge routers of the 210. In particular, the AS topological distance between the WAN 210 and the source 228 of traffic entering the WAN may be related to the difficulty of prediction. It may be expected that the further away a source AS is, the more intermediate ASes impose their independent and opaque policies on the route announcements that the WAN 210 makes. Additionally, the Internet topology is generally flattening with almost 60% of incoming traffic bytes coming from an AS that peers directly with the WAN 210, and 98.2% of incoming traffic bytes coming from ASes at most 3 AS hops away. Based on the flat topology, it might be reasonable to assume that the closer a source is to the WAN 210, the fewer paths the source selects to reach the WAN 210, as fewer route selection decisions are made. However, analysis of every source AS that sent traffic to WAN 210, showed that 50% of the bytes coming from ASes that are one hop away are sprayed across up to 182 peering links. Interestingly, the further away the source 228 is, the fewer peering links will receive the traffic. One reason for this unexpected finding is that large content delivery networks (CDNs) that peer with the WAN 210 have isolated pockets of their networks across the globe that can only reach the WAN 210 through public connectivity, because they lack a global WAN. These two characteristics combine to make the problem of traffic ingress prediction non-trivial.

The goal of the traffic ingress prediction problem is to predict, for a given flow f, through which of (the possibly thousands of) peering links that f will enter the WAN 210. In particular, from an ingress traffic management perspective, the ingress traffic engineering system 300 is interested in the ingress peering link rather than the entire Internet path. In an aspect, a peering link may be defined at the granularity of an individual eBGP session. The peering link may be running on a virtual interface comprised of a bundle of physical links, or the peering link may be running on a virtual interface that is one of many on a physical interface. Predicting the ingress peering link is more feasible than predicting the entire path, and yet still provides substantial value for important WAN operational tasks such as congestion mitigation.

A flow f enters the WAN through peering link l, written as ingress(f)=l. The goal of the traffic ingress prediction system is then, given a set of peering links £ for a network, and a flow f, to produce a set of k predicted links $£_p^f = \{l_1, \ldots, l_k\} \subseteq £$, which maximizes the probability: $P(ingress(f) \in £_p^f)$. Specifically, the ingress model 142 may be tuned by a network operator to select the number of multiple links (k) in order to trade off prediction accuracy and operational utility. Increasing the parameter k can increase prediction accuracy but provides less actionable information. In addition, a flow may enter the network at multiple links (due to load balancing, or multiple flows being combined into a flow aggregate, or a flow shifting over time), and reducing k will limit how many of these multiple links can be predicted, with the probability value predicting what fraction of the bytes of the flow will arrive on that link.

In an aspect, the ingress model 142 may be based on various feature sets and different models may provide benefits for various network topologies and constraints. The traffic ingress prediction problem can be viewed as a learning problem. Given real observations about where traffic has entered the network in the past, the traffic ingress prediction system 330 can use the observations to build a model of WAN ingress (e.g., ingress model 142) to make predictions about where future or unseen traffic will arrive. The traffic ingress prediction system 330 may not attempt to predict the future traffic matrix, which is a complementary problem.

A key design issue with any learning task is choosing the right features for the problem. In the context of ingress traffic prediction, features are derived from the sampled ingress traffic and combined with information about the network (e.g., cloud provider network 110). In an aspect, a dataset may include information about the complete network topology of the cloud provider network 110. Numerical examples of the size of the dataset are given for a global cloud provider network. In particular, features related to the IP layer, (e.g., source prefix) are the most likely to influence routing decisions. For example, the following features may be used as input to an ingress model 142:
  1) Source AS: AS number where the packet originated, based on the source IP address of the sampled flows and BGP advertisements observed from BMP.
  2) Source prefix: All traffic entering the WAN 210 is from a source IP address on the Internet. Using the entire/32 bits of IPv4 addresses significantly increases the feature space. In contrast, aggregating IPv4 addresses to the announced routing block sizes may hide too much useful information, especially if BGP Route Aggregation is enabled by some ASes. In this trade-off between resolution and feature space, the/24 prefix of the source IP may be used as the feature. The/24 prefix is the widely accepted limit on routable prefix length and inter-domain routing policies could operate at that boundary, which would influence which peering link traffic arrives on.
  3) Source location: One issue with using source prefixes as a feature is the size of the feature space. A global WAN 210 may have over 13 million/24 prefixes in the dataset. Therefore the source location may also use mappings from source IP addresses to coarse geo-location (at the level of large metropolitan areas). Traffic originating in the same AS and geographic area with the same destination may share paths.
  4) Destination region: All traffic entering the WAN 210 is destined to an endpoint in the network, such as a datacenter server. The geographic location of the destination within the network may serve as a feature.
  5) Destination type: This is the type of service provided by the destination server (e.g., web service, storage). Load balancing at the application layer (e.g., DNS) may influence how traffic shifts, and this behavior may depend on the destination service.

In an aspect, the ingress model 142 may use source AS (e.g., AS 220) and both destination region and destination type. Various combinations with source prefix (P) and source location (L). Table 1 shows the resulting combinations, together with the number of unique values of the features at the bottom, and the number of unique combinations on the right. Since there is only one location per/24 prefix in the dataset, the APL combination is equivalent to the AP combination. However, training a model without source prefix but with source location (AL) allows for transfer learning between flows that are arriving from the same geographic location, with a different prefix. In the dataset, there are 564 unique source locations and over 13.5 million unique/24 source prefixes.

TABLE 1

| Name | Source | | | Destination | | # |
| --- | --- | --- | --- | --- | --- | --- |
| | AS | Prefix | Location | Region | Type | |
| A | • | | | • | • | ~9M |
| AP | • | • | | • | • | ~400M |
| AL | • | | • | • | • | ~15M |
| # | ~72K | ~13.6M | ~600 | ~125K | ~200 | |

The traffic ingress prediction system 330 may include models that fit the problem definition and feature space, without unnecessary complexity or long query time when addressing ongoing congestion. As such, there are several relevant design considerations:

Large feature space: there are over 70K ASes and over 125K internal destination locations in the dataset. These features are categorical, with no simple way to reduce their dimensionality. Furthermore, there are over 13 M source/24 prefixes. While the IP address space is hierarchical, it also has growing fragmentation, and potentially arbitrary discontinuities. The large categorical feature space makes it difficult to use certain classification algorithms such as those based on decision trees (e.g., random forest). For example, using these features in a random forest model generated very large and deep trees, which were brittle and impractical.

Large number of classes: there are thousands of peering links in the network, each of which represents a separate prediction class. A statistical classification model must assign, to each such peering link, a probability for it being used as the ingress point for a given flow.

Dynamic/evolving network: the peering of WAN 210 with other networks changes over time, peering between other distant ASes also evolves, and routing policies at these networks also change over time. All of these changes impact the routing behavior of Internet flows. It is important that the learning models be (re)trained quickly, even taking into account the large feature space and the number of classes.

In an aspect, given the above design considerations, for ingress traffic prediction, two types of simple statistical classification models that combine fast, single-pass training with small memory footprint, support explainability, and offer accuracy that is close to that of an oracle are preferred for the ingress model 142: Naïve Bayes models and a class of Historical Models. Both model classes allow for weighting of training samples by traffic volume. Weighting training samples (1) provides relative importance to larger flows within a flow aggregate; (2) ignores a random stray packet of a flow that arrives on a very different peering link; (3) predicts what fraction of a flow will arrive on one link, and what fraction on a second link, and so on; and (4) makes adversarial attacks against the models more challenging. In particular, the results from the historical model dominate those from Naïve Bayes for the example global cloud provider network 110. Other models may be advantageous for other types of networks.

Internet routing policies are (usually) slow-changing and hence the likelihood that traffic with the same characteristics will arrive at an ingress link that was used in the past is high. Accordingly, a Historical model (Hist) that looks at the recent past history to predict the ingress link for a flow is suitable for the ingress model 142.

Represented notationally, $B(\cdot)$ represents the total bytes seen in training for a given condition $(\cdot)$. For example, $B(AS=3, l=129)$ is the number of bytes seen on all flows from AS 3 on link index 129. For a given flow $f=<f1, f2, \ldots, fn>$, represented by a subset of the features above (e.g., f1=source AS, f2=source prefix, etc.), the model computes the probability that ingress(f)=l, which is written as p(l|f):

B(f,1)
p(l|f)=B(f)

Given this definition, l|p is then simply the set of the top-k peering links sorted by p(l|f).

The traffic ingress prediction system 330 may train a Historical model by (i) collecting all the unique combinations of features seen during training (feature tuples), (ii) finding all the ingress links used for each tuple, and (iii) ranking the peering links according to how much traffic belonging to the tuple was measured. The traffic ingress prediction system 330 uses the ranks of the links as priorities when using the model 142 to predict a peering link.

The most significant limitation of the historical model is that (unlike NB) there is no cross learning between tuples: if an ingress link was not seen for a given tuple during training, the ingress link cannot be predicted for that tuple. This limitation also means that if a tuple was not seen during training, the model cannot predict an ingress link. However, on the flip side, this limitation allows the model to prevent independent flows from affecting each other (unlike NB). However, the larger the flow aggregate, such as in AL, the more specific flows will be included in the aggregate. Accordingly, there may be some transfer learning between those specific flows within a single flow aggregate.

In an aspect, three Historical models according to the feature sets from Table 1 are suitable for the ingress model 142: $Hist_A$, $Hist_{AP}$, $Hist_{AL}$. Because there is only one location per prefix, $Hist_{APL}$ is equivalent to $Hist_{AP}$.

Ensemble models: Further, combinations of models may be utilized sequentially as an ensemble model. For example, sequential ensembles of the above models may leverage their complementary strengths. For instance, an ensemble model A/B may refer to a sequential composition of the models A and B. The traffic ingress prediction system 330 may resort to model B if there is no prediction for a flow in model A. The following ensemble models appear to provide improved prediction: HistAP/AL/A and HistAL/AP/A.

Geographic distance of peering: Finally, there are flow aggregates for which the training data may not include k alternative ingress links, even though they may exist. In these cases, geographic distance may be used to find alternate peering links. The traffic ingress prediction system 330 takes the peering AS A and ingress location 1 for the best match (k=1), and ranks the other peering interfaces from A by geographic distance to 1. The type of ensemble model then uses this ranked list to complete the list of interfaces returned. This ensemble model may be applied on top of the AL models (as it was the best for unseen withdrawals) and may be referred to as an AL+G model. Table 2 summarizes suitable models and features for the ingress model 142.

| Type | Name | Features |
|---|---|---|
| Historical | $Hist_A$ | AS, Dest |
|  | $Hist_{AP}$ | AS, Prefix, Dest |
|  | $Hist_{AL}$ | AS, Source Location, Dest |

-continued

| Type | Name | Features |
|---|---|---|
| Ensemble | $Hist_{AP/AL/A}$ | $Hist_{AP}$ then $Hist_{AL}$ then $Hist_A$ |
|  | $Hist_{AL/AP/A}$ | $Hist_{AL}$ then $Hist_{AP}$ then $Hist_A$ |
| +Distance | $Hist_{AL + G}$ | $Hist_{AL}$ + Geographic Distance |

When the CMS 310 asks the traffic ingress prediction system 330 for a prediction, the CMS 310 provides a set of traffic flows (tuples and bytes), the prefixes that will be withdrawn, and at which peering links the prefixes will be withdrawn. The traffic ingress prediction system 330 operates on those input flows as is and does not predict future traffic volumes. In practice, the list of flows and volumes from recent past peak times tends to be sufficient.

The traffic ingress prediction system 330 utilizes three types of data: BMP, IPFIX, and Metadata. The BGP Monitoring Protocol (BMP) data is collected from the WAN 210. The BMP collector 344 exports all the announcements and withdrawals that a router has received from any neighbor, even if those advertisements do not impact the forwarding table. BMP data listeners are spread across the WAN 210, connect to BGP routers including all peering routers, store advertisements in a large data lake, and use automatic mechanisms to recover from failures. The traffic ingress prediction system 330 does not use this BMP to train any models, but rather uses the BMP data to provide a rich view of the Internet topology from the vantage of the WAN 210. The traffic ingress prediction system 330 does not use BMP data from other ASes, as those data are not available to the traffic ingress prediction system 330.

IP Flow Information Export (IPFIX) data is also collected from the WAN 210. The IPFIX collector 342 exports flow level information for data-plane packets that traverse a router interface. Due to the massive amount of traffic traversing the WAN 210, the IPFIX collector 342 configured to sample 1 out of every 4096 packets at random. While the sampling reduces the likelihood of capturing short-lived or low throughput flows, most of the use cases for the traffic ingress prediction system 330 concern shifts in large volumes of traffic. Similar to BMP, the WAN 210 has distributed IPFIX collectors 342 that consolidate the flow data into a conceptually central data lake. The traffic ingress prediction system 330 processes only the ingress flows recorded at all the peering routers. The important fields in the IPFIX data include source address prefix, source ASN, destination address prefix, timestamp, and number of bytes scaled up by the sampling rate.

Network metadata is used to augment the BMP data and the IPFIX data. The destinations of all the IPFIX flows that the traffic ingress prediction system 330 processes are all inside the WAN 210. The traffic ingress prediction system 330 identifies which cloud service (e.g., storage or e-mail) and which metropolitan region the flows are destined to. The traffic ingress prediction system 330 uses a comprehensive internal Geo-IP database to identify in which country and metropolitan region the external source prefix originates. The BMP data and the IPFIX data have the identity of the router and interface that the data was collected from, and the traffic ingress prediction system 330 looks up which peer that link connects to and in which geographic region the router is located.

Explicit attempts at ingress traffic engineering by altering outbound BGP route announcements (e.g., by AS path prepending) can alter the "normal" flow of ingress traffic. Such human-induced meddling could have adverse effects on the prediction accuracy of the traffic ingress prediction system 330. During testing, prefixes that were involved in any kind of ingress traffic engineering accounted for 0.7% of all the prefixes announced by the WAN 210 and none of these prefixes were present in the destination addresses in the IPFIX flows. These prefixes may have been used for measurement experiments with minuscule amounts of traffic.

The traffic ingress prediction system 330 stores all data in a large, geographically-distributed data lake that is accessible to cloud compute systems of the WAN 210. The volume of data is large—the BMP and IPFIX data each consume TBs of storage per day. To allow the training system 360 to train and test on weeks of data, the data aggregation system 350 utilizes a multistage pipeline. The data aggregation system 350 is configured to aggregate and compress the data prior to feeding the data to the training system 360. For example, the data aggregation system 350 may aggregate the IPFIX data into hour long chunks, indexed by only the features that the traffic ingress prediction system 330 uses. The data aggregation system 350 may join this IPFIX data with metadata to add additional salient information as previously described. The data aggregation system 350 may compress the features in this data by using a simple dictionary (i.e., ordinal encoding). Finally, the data aggregation system 350 extracts the topological information that the training system 360 needs on a per-prefix basis from the BMP data.

In an implementation, the data aggregation system 350 may be implemented on a highly performant, internal, big data processing system of the WAN 210. This processing system is optimized to scale on relatively simple tasks, such as filtering and joining, but is not flexible enough to support more complex tasks such as machine learning. In some implementations, the data aggregation system 350 is implemented in an SQL-like framework. After aggregation, the IPFIX data is 2% of the original size and the BMP data is 0.07% of the original size.

In an implementation, the training system 360 may be executed on a dedicated machine-learning cluster. For example, in one implementation, the machine-learning cluster included 6 worker nodes with 640 GB RAM and 80 cores each and NVMe storage, and a driver node with 256 GB RAM and 64 cores. The historical models discussed above require one pass on the data to train. When training the historical model, all the measured ingress traffic may be grouped by the respective flow tuples (as defined in Table 1) and ingress link, which requires memory and processing linear with the number of measurements (after the aggregation stage). Then for each flow tuple the peering links are ranked by bytes, keeping only the top k links. This requires memory and processing linear with the number of unique flow tuples in the data (the number of peering links per tuple is relatively very small). The resulting historical models are linear in size with the number of unique flow tuples in the training data. Using the historical model for predictions is essentially a lookup in the model table, which may be performed efficiently as a join between the list of flows of interest and the model table. The memory cost of the ensemble models is the sum of the costs of the components models; the runtime of the ensemble models is a weighted sum of the runtimes of the component models, where the weights depend on whether the queries are satisfied by an earlier model.

The CMS 310 leverages traffic ingress predictions to strategically shift traffic away from congested peering links. The CMS 310 monitors ingress peering link utilization. When the CMS 310 observes that traffic volume has exceeded a fixed threshold (e.g., greater than 85% link utilization for at least 4 minutes), the CMS 310 then identifies in the IPFIX data the fewest destination prefixes (top prefixes by traffic volume) at the affected peering links that if shifted, would bring utilization back down to acceptable levels. The CMS 310 then queries the traffic ingress prediction system 330 to determine which other peering links these flows would likely shift to if the CMS 310 were to withdraw each of those prefixes. Using this information, the CMS 310 determines which prefixes are safe to shift without overloading other peering links and yet will shift sufficient traffic away from the congested peering link. The CMS 310 then injects BGP withdrawal messages into the edge router for these prefixes. Later, when traffic volumes have returned to normal, those prefixes are re-announced at the original peering link.

In an aspect, the CMS 310 may determine an amount of traffic that is likely to be shifted to each peering link, and compare the volume to a headroom for the peering link. The headroom may be a difference between a utilization threshold and the utilization rate of each of the other peering links. For example, the amount of traffic may include one or more of a minimum volume, a probable volume, or a maximum volume. A minimum volume may refer to a volume of flows for which the peering link is the only predicted alternative peering link. A maximum volume may refer to a volume of all flows for which the peering link is a predicted alternative peering link (e.g., even if the peering link is the third most likely alternative). A probable volume may refer to a volume of flows for which the peering link is the first most likely predicted alternative peering link. In an implementation, when determining which prefixes are safe to shift without overloading other peering links, the CMS 310 may initially determine that a withdrawal is not safe if the minimum volume is greater than a headroom of the peering link. If there are multiple safe prefixes according to the minimum volume, the CMS 310 may consider whether the prefixes are safe according to the probable volume. If there are multiple safe prefixes according to the probable volume, the CMS 310 may select a prefix where the maximum volume results in the most headroom for all of the alternative peering links.

In an implementation, the peering links predicted for any flow may be limited to k links to reduce complexity. The CMS 310 needs to know which peering link(s) will receive large volumes of traffic in different situations, and small amounts of bytes are immaterial to that need. Generally, a value of k=3 may provide accuracy of approximately 97%. That is, 97% of the traffic will arrive at one of the top three predicted peering locations.

FIG. 4 is a schematic diagram of an example of an apparatus 400 (e.g., a computing device) for managing ingress traffic. The apparatus 400 may be implemented as one or more computing devices in the cloud network 110 or the WAN 210.

In an example, the apparatus 400 includes at least one processor 402 and a memory 404 configured to execute or store instructions or other parameters related to providing an operating system 406, which can execute one or more applications or processes, such as, but not limited to, the ingress traffic engineering system 300. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein. In some implementations, the apparatus 400 is implemented as a distributed processing system, for example, with multiple processors 402 and memories 404 distributed across physical systems such as servers or data centers.

In an example, the ingress traffic engineering system 300 includes the traffic ingress prediction system 330 and the CMS 310. The traffic ingress prediction system 330 includes the data collection system 340, the data aggregation system 350, and the training system 360. In some implementations, the memory 404 includes the database 352 of the data aggregation system 350. The congestion mitigation system 310 includes the prefix selector 312, the withdrawal simulator 314, and the BGP updater 316.

FIG. 5 is a flow diagram of an example of a method 500 for managing ingress traffic in a cloud network. For example, the method 500 can be performed by the ingress traffic management system 300, the apparatus 400 and/or one or more components thereof to manage ingress traffic to the cloud network 110 or the WAN 210.

At block 510, the method 500 includes training a model based on traffic arrival information for peering links of a network to predict a probability of a traffic flow arriving on a peering link. In an example, the training system 360, e.g., in conjunction with processor 402, memory 404, and operating system 406, can train the ingress model 142 based on traffic arrival information for peering links (e.g., peering links 242, 244, 246, 252, 254) of a network to predict a probability of a traffic flow arriving on a peering link.

At block 520, the method 500 optionally includes applying a received flow to the model to determine whether arrival information of the received flow corresponds to predicted arrival information for the received flow. In an example, the flow analyzer 318, e.g., in conjunction with processor 402, memory 404, and operating system 406, can apply the received flow to the model 142 to determine whether arrival information of the received flow corresponds to predicted arrival information for the received flow. For example, the flow analyzer 318 may query the model 142 with the flow and compare the peering link of the received flow to the predicted peering links for the received flow. In some implementations, the flow analyzer 318 may randomly sample received flows at a sampling rate based on available resources.

At block 530, the method 500 optionally includes routing the received flow for processing as potentially malicious traffic in response to the arrival information of the received flow not matching predicted arrival information for the received flow. In an example, the flow analyzer 318, e.g., in conjunction with processor 402, memory 404, and operating system 406, can route the received flow for processing as potentially malicious traffic in response to the arrival information of the received flow not matching predicted arrival information for the received flow. For example, if the arrival information does not match the predicted arrival information, the received flow likely includes spoofed IP header information; so the flow can be further processed to determine whether the flow includes malicious traffic.

At block 540, the method 500 includes determining, in response to a condition, a set of prefixes to withdraw based on other peering links to which traffic would be shifted. In an example, the prefix selector 312, e.g., in conjunction with processor 402, memory 404, and operating system 406, can determine, in response to a condition, a set of prefixes to withdraw based on the other peering links to which traffic would be shifted. In some implementations, the condition may be an ingress congestion event, which may be detected based on a utilization rate of a peering link. The set of prefixes may be selected to reduce the utilization rate. Further details of an example method of determining the set of prefixes is described below with respect to FIG. 6. In some implementations, at sub-block 542, the block 540 may optionally include filtering output of the model to exclude a second set of peering links based on the condition. For instance, for the ingress congestion condition, the prefix selector 312 may filter the peering links that are experiencing the ingress congestion condition on the assumption that the prefixes will be withdrawn from the congested peering links.

At block 550, the method 500 includes predicting based on the model, for traffic flows arriving on one or more peering links, other peering links to which the traffic flows would be shifted due to a condition affecting the one or more peering links. In an example, the traffic ingress prediction system 330, e.g., in conjunction with processor 402, memory 404, and operating system 406, can predict based on the model 142, for traffic flows arriving on one or more peering links, other peering links to which the traffic flows would be shifted due to a condition (e.g., ingress congestion) affecting the one or more peering links. For example, the traffic ingress prediction system 330 may receive a query for one or more traffic flows. In some implementations, the model 142 is a historical model with a feature set including at least a source AS, a destination region, and a destination type for each traffic flow. The model 142 may produce a set of the k most likely peering links where the one or more traffic flows are likely to arrive. In some implementations, the model 142 is configured to output probabilities for at least three other peering links. In some implementations, the model 142 may output a likely amount of volume for each of the other peering links. For example, the amount of volume may include one or more of a minimum volume, a probable volume, or a maximum volume.

At block 560, the method 500 may optionally include determining whether the network has sufficient capacity on the other peering links for the traffic flows. In an example, the ingress traffic engineering system 300, e.g., in conjunction with processor 402, memory 404, and operating system 406, can determine whether the network 110, 210 has sufficient capacity on the other peering links for the traffic flows. For example, the condition may be a hypothetical failure of the one or more peering links. Accordingly, the ingress traffic engineering system 300 may provide capacity planning for the network 110, 220.

At block 570, the method 500 includes injecting a route withdrawal message into an edge router associated with the one or more peering links for the set of prefixes to withdraw. In an example, the BGP updater 316, e.g., in conjunction with processor 402, memory 404, and operating system 406, can injecting a route withdrawal message into an edge router 120 associated with the one or more peering links for the set of prefixes to withdraw.

FIG. 6 is a flow diagram of an example of a method 600 for determining a set of prefixes to withdraw due to a congestion condition. For example, the method 600 can be performed by the ingress traffic management system 300, the apparatus 400 and/or one or more components thereof to manage ingress traffic to the cloud network 110 or the WAN 210.

At block 610, the method 600 includes monitoring peering link utilization. In an example, the data collection system 340 and/or IPFIX collector 342, e.g., in conjunction with processor 402, memory 404, and operating system 406, can monitor peering link utilization.

At block 620, the method 600 includes determining whether a utilization level for a peering link has exceeded a utilization threshold. In an example, the data collection system 340, e.g., in conjunction with processor 402, memory 404, and operating system 406, can determine whether a utilization level for a peering link has exceeded a utilization threshold. If the data collection system determines that a utilization level for a peering link has exceeded a utilization threshold, the data collection system 340 may identify the peering link to the CMS 310, for example, by sending a congestion event indication. The method 600 proceeds to block 630 when the data collection system determines that a utilization level for a peering link has exceeded a utilization threshold. In some implementations, the method 600 proceeds to block 625 when the data collection system 340 does not determine that a utilization level for a peering link has exceeded a utilization threshold.

At block 625, the method 600 may optionally include re-announcing withdrawn prefixes. For example, if the BGP updater 316 has withdrawn any prefixes for a peering location, and the peering location is no longer congested, the BGP updater 316 may re-announce the withdrawn prefixes.

At block 630, the method 600 includes determining candidate prefixes at the peering link. In an example, the prefix selector 312, e.g., in conjunction with processor 402, memory 404, and operating system 406, can determine candidate prefixes at the peering link. For example, the candidate prefixes may include a set of candidate prefixes that have been announced for the peering link. The prefix selector 312 may also determine an amount of traffic for each candidate prefix.

At block 640, the method 600 includes identifying at least one candidate prefix to reduce utilization. In an example, the prefix selector 312, e.g., in conjunction with processor 402, memory 404, and operating system 406, can select at least one candidate prefix of the set of candidate prefixes with an amount of traffic that would reduce the utilization level of the peering link below the utilization threshold if stopped. For example, the prefix selector 312 may identify candidate prefixes having a total amount of traffic that is greater than a difference between the utilization rate and the utilization threshold.

At block 650, the method 600 includes querying the model to predict other peering links. In an example, the withdrawal simulator 314, e.g., in conjunction with processor 402, memory 404, and operating system 406, can querying the model 142 and/or traffic ingress prediction system 330 to predict other peering links to which the traffic flows would be shifted due to a condition affecting the one or more peering links. For example, the block 650 may correspond to the block 550 of method 500, wherein traffic flows for the at least one candidate prefix are the traffic flows arriving on one or more peering links that are provided to the model 142.

At block 660, the method 600 includes allocating volume of traffic flows for candidate prefix to other peering links. In an example, the withdrawal simulator 314, e.g., in conjunction with processor 402, memory 404, and operating system 406, can allocate an amount of volume of the traffic flows for the at least one prefix to the other peering links to which traffic would be shifted. For example, the amount of volume may include one or more of a minimum volume, a probable volume, or a maximum volume.

At block 670, the method 600 includes determining whether it is safe to withdraw a candidate prefix. In an example, the withdrawal simulator 314, e.g., in conjunction with processor 402, memory 404, and operating system 406, can determine whether it is safe to withdraw a candidate prefix. A candidate prefix may be considered safe if the amount of traffic for the candidate prefix will not cause any of the other peering links to exceed the utilization threshold. For example, the withdrawal simulator 314 may determine whether withdrawal of the at least one prefix would result in traffic to the other peering links to exceed a headroom of the other peering links. The headroom may be a difference between a utilization threshold and the utilization rate of each of the other peering links. The method 600 may proceed to block 680 when the withdrawal simulator 314 determines that a prefix is safe to withdraw. In some implementations, the method 600 may return to block 640 to identify additional candidate prefixes when the withdrawal simulator 314 determines that a prefix is not safe to withdraw.

At block 670, the method 600 includes withdrawing safe prefixes. In an example, the BGP updater 316, e.g., in conjunction with processor 402, memory 404, and operating system 406, can withdraw safe prefixes. The block 670 may correspond to block 560 of the method 500.

Figure 7:
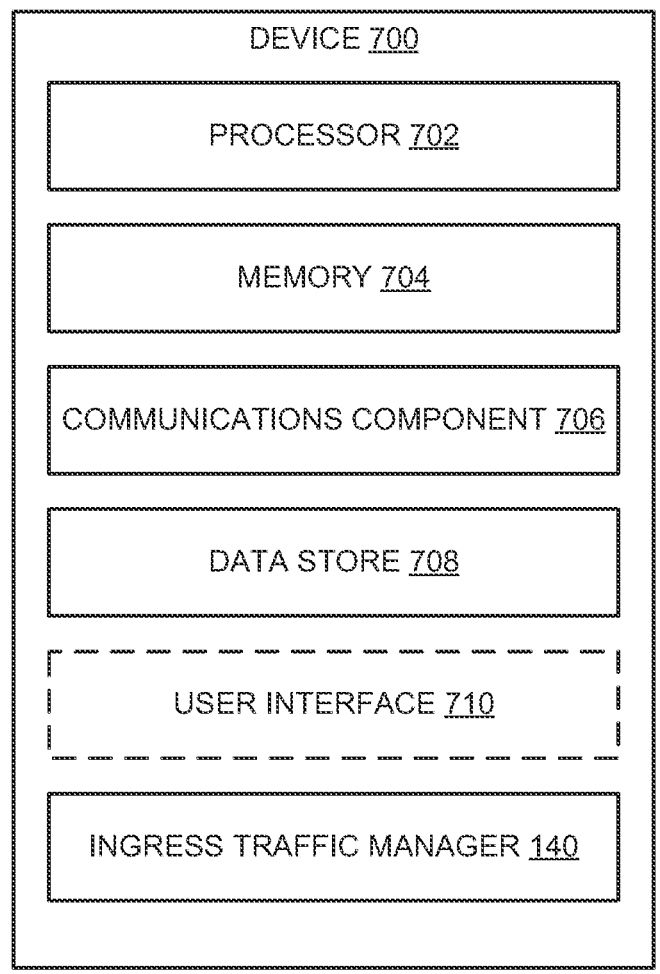
FIG. 7 is a schematic diagram of an example of a device for performing functions of egress routing described herein, in accordance with aspects described herein.

FIG. 7 illustrates an example of a device 700 including additional optional component details as those shown in FIG. 4. In one aspect, device 700 include processor 702, which may be similar to processor 402 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 further includes memory 704, which may be similar to memory 404 such as for storing local versions of operating systems (or components thereof) and/or applications being executed by processor 702, such as the ingress traffic manager 140, the CMS 310, the traffic ingress prediction system 330, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 includes a communications component 706 that provides for establishing and maintaining communications with one or more other devices, parties, entities, etc. utilizing hardware, software, and services as described herein. Communications component 706 carries communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the ingress traffic manager 140.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 additionally includes the ingress traffic manager 140 for managing ingress traffic in a cloud network 110 or WAN 210, training system 360 for training a model 142 based on traffic arrival information for peering links of a network to predict a probability of a traffic flow arriving on a peering link, the model 142 for predicting, for traffic flows arriving on one or more peering links, other peering links to which the traffic flows would be shifted due to a condition affecting the one or more peering links, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

1. A system for ingress traffic management comprising:
   a collection system within a network configured to collect traffic arrival information for peering links of the network;
   a training system configured to train a model based on the traffic arrival information to predict a probability of a traffic flow arriving on a peering link; and
   a congestion mitigation system configured to:
   predict based on the model, for traffic flows arriving on one or more peering links, other peering links to which the traffic flows would be shifted due to a condition affecting the one or more peering links;
   determine, in response to the condition, a set of prefixes to withdraw based on the other peering links to which traffic would be shifted; and
   inject a route withdrawal message into an edge router associated with the one or more peering links for the set of prefixes to withdraw.

2. The system of clause 1, wherein the set of prefixes to withdraw is predicted to result in the traffic shifted to the other peering links to be less than a headroom of the other peering links.

3. The system of clause 1 or 2, wherein to determine the set of prefixes to withdraw, the congestion mitigation system is configured to filter output of the model to exclude a second set of peering links based on the condition.

4. The system of any of clauses 1-3, wherein to determine the set of prefixes to withdraw, the congestion mitigation system is configured to:
   determine that a utilization level for a peering link has exceeded a utilization threshold;
   determine a set of candidate prefixes that have been announced for the peering link and an amount of traffic for each candidate prefix;
   select at least one candidate prefix of the set of candidate prefixes with an amount of traffic that would reduce the utilization level of the peering link below the utilization threshold if stopped,
   wherein traffic flows for the at least one candidate prefix are the traffic flows arriving on one or more peering links that are provided to the model; and
   allocate an amount of volume of the traffic flows for the at least one candidate prefix to the other peering links to which traffic would be shifted to determine whether withdrawal of the at least one candidate prefix would result in traffic to the other peering links to exceed a headroom of the other peering links.

5. The system of clause 4, wherein amount of volume includes one or more of a minimum volume, a probable volume, or a maximum volume.

6. The system of any of clauses 1-5, wherein the congestion mitigation system is configured to apply a received flow to the model to determine whether arrival information of the received flow corresponds to predicted arrival information for the received flow.

7. The system of clause 6, wherein the congestion mitigation system is configured to route the received flow for processing as potentially malicious traffic in response to the arrival information of the received flow not matching predicted arrival information for the received flow.

8. The system of any of clauses 1-7, wherein the model is a historical model with a feature set including at least a source autonomous system (AS), a destination region, and a source location for each traffic flow.

9. The system of any of clauses 1-8, wherein the model is configured to output probabilities for at least three other peering links.

10. A method comprising:
   training a model based on traffic arrival information for peering links of a network to predict a probability of a traffic flow arriving on a peering link;
   predicting based on the model, for traffic flows arriving on one or more peering links, other peering links to which the traffic flows would be shifted due to a condition affecting the one or more peering links;
   determining, in response to the condition, a set of prefixes to withdraw based on the other peering links to which traffic would be shifted; and
   injecting a route withdrawal message into an edge router associated with the one or more peering links for the set of prefixes to withdraw.

11. The method of clause 10, wherein the set of prefixes to withdraw is predicted to result in the traffic shifted to the other peering links to be less than a headroom of the other peering links.

12. The method of clause 10 or 11, wherein determining, in response to the condition, the set of prefixes to withdraw comprises filtering output of the model to exclude a second set of peering links based on the condition.

13. The method of any of clauses 10-12, wherein determining, in response to the condition, the set of prefixes to withdraw comprises:
   determining that a utilization level for a peering link has exceeded a utilization threshold;
   determining a set of candidate prefixes that have been announced for the peering link and an amount of traffic for each candidate prefix;
   selecting at least one candidate prefix of the set of candidate prefixes with an amount of traffic that would reduce the utilization level of the peering link below the utilization threshold if stopped,
   wherein traffic flows for the at least one candidate prefix are the traffic flows arriving on one or more peering links that are provided to the model; and
   allocating an amount of volume of the traffic flows for the at least one candidate prefix to the other peering links to which traffic would be shifted to determine whether withdrawal of the at least one candidate prefix would result in traffic to the other peering links to exceed a headroom of the other peering links.

14. The method of clause 13, wherein amount of volume includes one or more of a minimum volume, a probable volume, or a maximum volume.

15. The method of any of clauses 10-14, further comprising applying a received flow to the model to determine whether arrival information of the received flow corresponds to predicted arrival information for the received flow.

16. The method of clause 15, further comprising routing the received flow for processing as potentially malicious traffic in response to the arrival information of the received flow not matching predicted arrival information for the received flow.

17. The method of any of clauses 10-16, wherein the model is a historical model with a feature set including at least a source autonomous system (AS), a destination region, and a source location for each traffic flow.

18. The method of any of clauses 10-17, wherein the model is configured to output probabilities for at least three other peering links.

19. A computer-readable medium storing computer-executable instructions that when executed by a processor, cause the processor to:
   train a model based on traffic arrival information for peering links of a network to predict a probability of a traffic flow arriving on a peering link;
   predict based on the model, for traffic flows arriving on one or more peering links, other peering links to which the traffic flows would be shifted due to a condition affecting the one or more peering links; and
   determine whether the network has sufficient capacity on the other peering links for the traffic flows.

20. The computer-readable medium of clause 19, wherein the condition is a hypothetical failure of the one or more peering links.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for ingress traffic management comprising:
   a collection system within a network configured to collect traffic arrival information for peering links of the network;
   a training system configured to train a model based on the traffic arrival information to predict a probability of a traffic flow arriving on a peering link; and
   a congestion mitigation system configured to:
      predict based on the model, for traffic flows arriving on one or more peering links,
      other peering links to which the traffic flows would be shifted due to a condition affecting the one or more peering links;
      determine, in response to the condition, a set of prefixes to withdraw based on the other peering links to which traffic would be shifted;
      determine whether the network has sufficient capacity on the other peering links for the traffic flows;
      inject a route withdrawal message into an edge router associated with the one or more peering links for the set of prefixes to withdraw;
      apply a received flow to the model to determine whether arrival information of the received flow corresponds to predicted arrival information for the received flow; and
      route the received flow for processing as potentially malicious traffic in response to the arrival information of the received flow not matching predicted
arrival information for the received flow.

2. The system of claim 1, wherein the set of prefixes to withdraw is predicted to result in the traffic shifted to the other peering links to be less than a headroom of the other peering links.

3. The system of claim 1, wherein to determine the set of prefixes to withdraw, the congestion mitigation system is configured to filter output of the model to exclude a second set of peering links based on the condition.

4. The system of claim 1, wherein to determine the set of prefixes to withdraw, the congestion mitigation system is configured to:
   determine that a utilization level for a peering link has exceeded a utilization threshold;
   determine a set of candidate prefixes that have been announced for the peering link and an amount of traffic for each candidate prefix;
   select at least one candidate prefix of the set of candidate prefixes with an amount of traffic that would reduce the utilization level of the peering link below the utilization threshold if stopped,
   wherein traffic flows for the at least one candidate prefix are the traffic flows arriving on one or more peering links that are provided to the model; and
   allocate an amount of volume of the traffic flows for the at least one candidate prefix to the other peering links to which traffic would be shifted to determine whether withdrawal of the at least one candidate prefix would result in traffic to the other peering links to exceed a headroom of the other peering links.

5. The system of claim 4, wherein amount of volume includes one or more of a minimum volume, a probable volume, or a maximum volume.

6. The system of claim 1, wherein the model is a historical model with a feature set including at least a source autonomous system (AS), a destination region, and a source location for each traffic flow.

7. The system of claim 1, wherein the model is configured to output probabilities for at least three other peering links.

8. A method comprising:
   training a model based on traffic arrival information for peering links of a network to predict a probability of a traffic flow arriving on a peering link;
   predicting based on the model, for traffic flows arriving on one or more peering links, other peering links to which the traffic flows would be shifted due to a condition affecting the one or more peering links;
   determining, in response to the condition, a set of prefixes to withdraw based on the other peering links to which traffic would be shifted;
   determining whether the network has sufficient capacity on the other peering links for the traffic flows;
   injecting a route withdrawal message into an edge router associated with the one or more peering links for the set of prefixes to withdraw;
   applying a received flow to the model to determine whether arrival information of the received flow corresponds to predicted arrival information for the received flow; and
   routing the received flow for processing as potentially malicious traffic in response to the arrival information of the received flow not matching predicted arrival information for the received flow.

9. The method of claim 8, wherein the set of prefixes to withdraw is predicted to result in the traffic shifted to the other peering links to be less than a headroom of the other peering links.

10. The method of claim 8, wherein determining, in response to the condition, the set of prefixes to withdraw comprises filtering output of the model to exclude a second set of peering links based on the condition.

11. The method of claim 8, wherein determining, in response to the condition, the set of prefixes to withdraw comprises:
    determining that a utilization level for a peering link has exceeded a utilization threshold;
    determining a set of candidate prefixes that have been announced for the peering link and an amount of traffic for each candidate prefix;
    selecting at least one candidate prefix of the set of candidate prefixes with an amount of traffic that would reduce the utilization level of the peering link below the utilization threshold if stopped,
    wherein traffic flows for the at least one candidate prefix are the traffic flows arriving on one or more peering links that are provided to the model; and
    allocating an amount of volume of the traffic flows for the at least one candidate prefix to the other peering links to which traffic would be shifted to determine whether withdrawal of the at least one candidate prefix would result in traffic to the other peering links to exceed a headroom of the other peering links.

12. The method of claim 11, wherein amount of volume includes one or more of a minimum volume, a probable volume, or a maximum volume.

13. The method of claim 8, wherein the model is a historical model with a feature set including at least a source autonomous system (AS), a destination region, and a source location for each traffic flow.

14. The method of claim 8, wherein the model is configured to output probabilities for at least three other peering links.

15. A non-transitory computer readable medium storing computer-executable instructions that when executed by a processor, cause the processor to:
    train a model based on traffic arrival information for peering links of a network to predict a probability of a traffic flow arriving on a peering link;
    predict based on the model, for traffic flows arriving on one or more peering links, other peering links to which the traffic flows would be shifted due to a condition affecting the one or more peering links;
    determine, in response to the condition, a set of prefixes to withdraw based on the other peering links to which traffic would be shifted;
    determine whether the network has sufficient capacity on the other peering links for the traffic flows;
    inject a route withdrawal message into an edge router associated with the one or more peering links for the set of prefixes to withdraw;
    apply a received flow to the model to determine whether arrival information of the received flow corresponds to predicted arrival information for the received flow; and
    route the received flow for processing as potentially malicious traffic in response to the arrival information of the received flow not matching predicted arrival information for the received flow.

16. The non-transitory computer-readable medium of claim 15, wherein the condition is a hypothetical failure of the one or more peering links.

\* \* \* \* \*